H. Merrick,

Tree Box.

No. 108,280.   Patented Oct. 11. 1870.

Witnesses:
E. F. Kastenhuber
C. Wahlers

Inventor:
Harry Merrick
By Van Santvoord & Hauff,
his Atty

United States Patent Office.

HARRY MERRICK, OF BROOKLYN, NEW YORK.

Letters Patent No. 108,280, dated October 11, 1870.

IMPROVEMENT IN TREE-BOXES.

The Schedule referred to in these Letters Patent and making part of the same.

*To all whom it may concern:*

Be it known that I, HARRY MERRICK, of Brooklyn, in the county of Kings and State of New York, have invented a new and useful Improvement in Tree-Boxes; and I do hereby declare the following to be a full, clear, and exact description thereof, which will enable those skilled in the art to make and use the same, reference being had to the accompanying drawing forming part of this specification, in which drawing—

Similar letters indicate corresponding parts.

Figure 1:
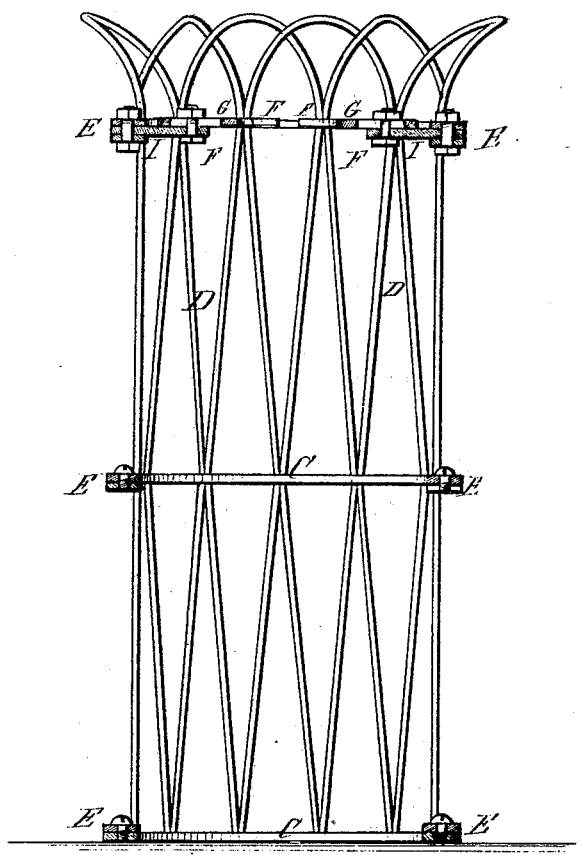
Figure 1 is an elevation of a vertical section of my improvement.
Figure 2:
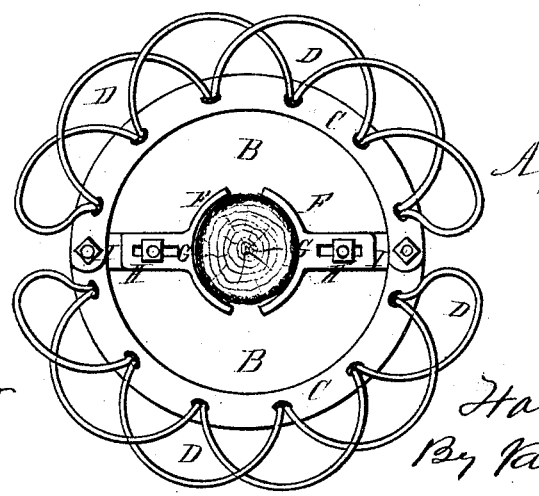
Figure 2 is a top view.

This invention relates to tree-boxes, and consists in a box made in vertical sections, each section being composed of wires arranged vertically, or in a general up-and-down direction, and passing through semicircular plates whose ends overlap, when the sections are joined, to form a cylindrical box. The sections are provided with adjustable semicircular braces, which come on opposite sides of the inclosed tree, and hold the tree and box to each other.

The letter A designates my tree-box, composed of sections B B, which are made with semicircular plates C and wires D, that pass up and down through the plates C, which are perforated for that purpose. In this example the wires D pass up through the plates, and are bent over at top, and flared outward, and passed down again, their course being deflected out of a straight line, and two thicknesses of wire being put through the same perforation. The ends of the semicircular plates C are so arranged as to overlap each other, and are secured together by screws E or other fastenings.

To the top plate C of the sections I attach semicircular or concave adjustable braces F F, arranged opposite to each other, so as to embrace the tree inclosed by the box. In this example the said braces are attached to the plates C by the same screws which unite the overlapping ends of said plates.

In constructing the braces F, I form a concave or semicircular arm, G, on one end of an adjustable slotted plate, H, which is united through its slot, by a screw and nut, to a bar, I, whose outer end is bolted to the plate C by the same screw which joins their overlapping ends. The hollows of the braces F are to be padded or covered with some suitable soft material that will not abrade or wound the bark of the tree.

By adjusting the slotted plates H on the bars I, the hollow arms of the braces are extended or withdrawn, so as to suit trees of different sizes, and so as to accommodate the growth of the trees.

The box is held down on the ground by clips in the ordinary manner, the points of the clips being driven into the ground with their heads catching on the edges of the lower plates C of the box. I have not shown the clips, as their construction and use are well known, and I make no claim to them.

I am aware that plates formed in a number of sections and having wooden upright panels, also that semicircular arms for steadying trees, are not new; such I do not broadly claim.

What I claim as new, and desire to secure by Letters Patent, is—

1. A tree-box, composed of sections B, built up of semicircular plates C, two or more, and wires D, the sections being united to each other by means of the overlapping ends of their plates C, substantially as described.

2. The semicircular plates F F, formed with arms G G and slotted plates H H, adjustably connected to the slotted bars I I by means of a screw and nut, and secured to the plates C C by the same bolt that unites their overlapping ends, all combined, arranged, and operating substantially as described.

HARRY MERRICK.

Witnesses:
J. VAN SANTVOORD,
W. HAUFF.